(12) United States Patent
Diehl et al.

(10) Patent No.: US 10,718,638 B1
(45) Date of Patent: Jul. 21, 2020

(54) SYSTEMS AND METHODS FOR USING PHOTONICS TO DETECT ALIGNMENT ANOMALY

(71) Applicant: Pony AI Inc.

(72) Inventors: Peter G. Diehl, Shanghai (CN); Cheng Jin, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/436,642

(22) Filed: Jun. 10, 2019

(51) Int. Cl.
*G01D 5/30* (2006.01)
*G01D 11/24* (2006.01)

(52) U.S. Cl.
CPC ............ *G01D 5/30* (2013.01); *G01D 11/245* (2013.01)

(58) Field of Classification Search
CPC ................................. G01D 5/30; G08G 1/095
USPC .................................................. 356/399–401
See application file for complete search history.

(56) References Cited

U.S. PATENT DOCUMENTS

| 8,953,647 | B1 | 2/2015 | Mead et al. |
| 10,069,347 | B2 | 9/2018 | Nakano et al. |
| 2010/0231414 | A1* | 9/2010 | Ballinger ............ B61L 5/1863 340/907 |
| 2019/0049977 | A1* | 2/2019 | Dean ................... G05D 1/0244 |
| 2019/0086550 | A1 | 3/2019 | Dussan et al. |

* cited by examiner

*Primary Examiner* — Hung Nguyen
(74) *Attorney, Agent, or Firm* — Sheppard Mullin Richter & Hampton LLP

(57) ABSTRACT

Systems and methods are provided for detecting alignment anomaly. A sensor enclosure can be translated along a fixture to a final alignment location on the fixture. A signal transmitted by a signal transmitter can be received by a signal receiver. The signal transmitter can be integrated into the sensor enclosure. The signal receiver can determine a signal intensity based on the received signal. The signal intensity can be determined based in part on the final alignment location of the sensor enclosure on the fixture. An enclosure alignment anomaly can be identified based on the signal intensity.

19 Claims, 10 Drawing Sheets

500

```
┌─────────────────────────────────────────────────────────────┐
│ Translate a sensor enclosure along a fixture to a final     │
│ alignment location on the fixture                           │
│ 502                                                         │
└─────────────────────────────────────────────────────────────┘
                              ↓
┌─────────────────────────────────────────────────────────────┐
│ Receive, by a signal receiver, a signal transmitted by a    │
│ signal transmitter, the signal transmitter integrated into  │
│ the sensor enclosure                                        │
│ 504                                                         │
└─────────────────────────────────────────────────────────────┘
                              ↓
┌─────────────────────────────────────────────────────────────┐
│ Determine, by the signal receiver, a signal intensity based │
│ on the received signal, the signal intensity determined     │
│ based in part on the final alignment location of the        │
│ sensor enclosure on the fixture                             │
│ 506                                                         │
└─────────────────────────────────────────────────────────────┘
                              ↓
┌─────────────────────────────────────────────────────────────┐
│ Identify an enclosure alignment anomaly based on the        │
│ signal intensity                                            │
│ 508                                                         │
└─────────────────────────────────────────────────────────────┘
```

FIG. 5

SYSTEMS AND METHODS FOR USING PHOTONICS TO DETECT ALIGNMENT ANOMALY

FIELD OF THE INVENTION

This disclosure relates to detecting alignment anomaly. More particularly, this disclosure relates to systems and methods for detecting alignment deviations of an sensor enclosure mounted on an autonomous vehicle before the deviations manifest.

BACKGROUND

In general, an autonomous vehicle (e.g., a driverless vehicle, a semi-autonomous vehicle, etc.) can have myriad sensors onboard the autonomous vehicle. For example, the myriad sensors can include light detection and ranging sensors (or LiDARs), radars, cameras, etc. The myriad sensors can play a central role in functioning of the autonomous vehicle. For example, a LiDAR can be utilized to detect and identify objects (e.g., other vehicles, road signs, pedestrians, buildings, etc.) in a surrounding. The LiDAR can also be utilized to determine relative distances of the objects to the LiDAR in the surrounding. For another example, radars can be utilized to aid with collision avoidance, adaptive cruise control, blind side detection, etc. For yet another example, cameras can be utilized to recognize, interpret, and/or analyze contents or visual cues of the objects. Data collected from these sensors can then be processed and used, as inputs, to make driving decisions. In general, sensors onboard the autonomous vehicle must be aligned before the sensors can be used by the autonomous vehicle to make driving decisions.

SUMMARY

Various embodiments of the present disclosure can include systems and methods configured for detecting alignment anomaly. A sensor enclosure can be translated along a fixture to a final alignment location on the fixture. A signal transmitted by a signal transmitter can be received by a signal receiver. The signal transmitter can be integrated into the sensor enclosure. The signal receiver can determine a signal intensity based on the received signal. The signal intensity can be determined based in part on the final alignment location of the sensor enclosure on the fixture. An enclosure alignment anomaly can be identified based on the signal intensity.

In some embodiments, the signal can reflect off from a reflective surface in the fixture and the signal receiver can be integrated into the sensor enclosure.

In some embodiments, the signal can be directly received by the signal receiver and the signal receiver can be integrated into the fixture.

In some embodiments, the enclosure alignment anomaly can be identified based on the signal intensity by aggregating data corresponding to the signal intensity for a set period. The data corresponding to the signal intensity can be processed to determine a maximum signal intensity, a minimum signal intensity, and an average signal intensity for the set period. A nominal range for the signal intensity can be determined over a period of time, the nominal range determined based on identifying an upper bound and a lower bound for the data corresponding to the signal intensity.

In some embodiments, the upper bound can be defined as a highest value in the maximum signal intensity over the period of time and the lower bound can be defined as a lowest value in the minimum signal intensity over the period of time.

In some embodiments, the upper bound and the lower bound can be determined using regression.

In some embodiments, the enclosure alignment anomaly can be identified based on the signal intensity by identifying a data point in the data corresponding to the signal intensity that falls outside of the nominal range. The data point can be identified as an enclosure alignment deviation.

In some embodiments, the enclosure alignment anomaly can be identified based on the signal intensity by trending the maximum signal intensity for the set period over the period of time. A trend can be determined based on the trending of the maximum signal intensity using at least a regression technique. The trend can be identified as a potential premature enclosure alignment deviation.

In some embodiments, the enclosure alignment anomaly can be identified based on the signal intensity by trending the average signal intensity for the set period over the period of time. A trend can be determined based on the trending of the average signal intensity using at least a regression technique. The trend can be identified as a potential premature enclosure alignment deviation.

In some embodiments, the enclosure alignment anomaly can be identified based on the signal intensity by training a machine learning model using a training data set. The machine learning model can be implemented using at least one of a classifier or a neural network. The training data set can be based on data corresponding to the signal intensity with human annotations. The data corresponding to the signal intensity can be received. Based on the data corresponding to the signal intensity, an existence of a potential premature enclosure alignment deviation can be determined in the data corresponding to the signal intensity.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 5 illustrates an example method, according to an embodiment of the present disclosure.

Figure 1A:
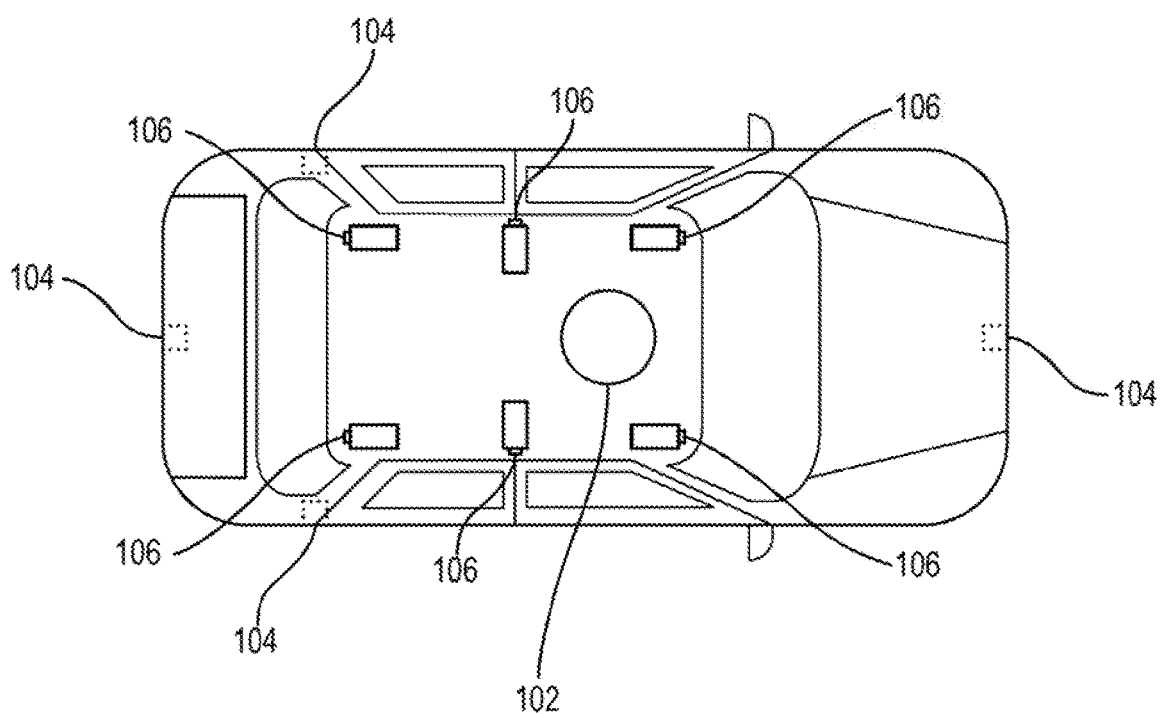
FIG. 1A illustrates an example autonomous vehicle, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In general, an autonomous vehicle (e.g., a driverless vehicle, a semi-autonomous vehicle, etc.) can have myriad sensors onboard the autonomous vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of the autonomous vehicle. For example, a LiDAR can be utilized to detect and identify objects (e.g., other vehicles, road signs, pedestrians, buildings, etc.) in a surrounding. The LiDAR can also be utilized to determine relative distances of the objects to the LiDAR in the surrounding. For another example, radars can be utilized to aid with collision avoidance, adaptive cruise control, blind side detection, assisted parking, etc. For yet another example, camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

In general, sensors onboard the autonomous vehicle must be aligned, meaning that the sensors must be placed at specific or particular locations on the autonomous vehicle such that data collected from the sensors is reliable to make driving decisions. For example, a LiDAR relies on speed of light and position of lasers beams to determine relative distances and locations of objects in a three dimensional surrounding. Data collected by the LiDAR, therefore, is highly dependent (or calibrated) to a specific location to which the LiDAR is located. Depending on where the LiDAR is located, the distances and the locations of the objects as determined by the LiDAR can vary. For example, time it takes for a reflected light to reach a LiDAR located in a front of the autonomous vehicle will be different from time it takes for the same reflected light to reach a LiDAR located in a back of the autonomous vehicle. This slight time difference, in some cases, can make the distance and the location determinations no longer reliable for use in guiding the autonomous vehicle. In some cases, the sensors can move out of alignment after the sensors are aligned. For example, over some period of time after being expose to real-world driving, the sensors may move out of alignment slightly (alignment shift) due to various vibrations or stresses (e.g., wind-resistances, inertial forces, etc.) the sensors experience while being onboard the autonomous vehicle. This alignment shift may cause data collected by the sensors to be out of calibration. Consequently, any driving decision that the autonomous vehicle makes based on the out-of-calibration data is no longer reliable and, in some cases, can lead to catastrophic results. Under conventional approaches, an operator of the autonomous vehicle must verify or reverify sensor alignments after the autonomous vehicle has been driven for some mile to ensure that data collected from the sensors are still in calibration. However, such an approach can be laborious, cumbersome and inefficient use of resources.

The disclosed technology alleviates this and other problems under the conventional approaches. Various embodiments of the disclosed technology overcome problems specifically arising in the realm of autonomous vehicle technology. In various embodiments, sensors (e.g., LiDARs, radars, cameras, etc.) onboard an autonomous vehicle can be encased or housed in an enclosure. The enclosure protects the sensors from negative effects (e.g., oxidation, UV rays, road debris, etc.) of being exposed in an environment. The enclosure allows the sensors to be moved from one autonomous vehicle to another autonomous vehicle easily. The enclosure also simplifies alignment of the sensors. For example, as long as the enclosure is aligned with respect to the autonomous vehicle, the sensors encased by the enclosure are also aligned with respect to the autonomous vehicle. In some embodiments, the enclosure can be installed or mounted onto a fixture of the autonomous vehicle. The enclosure can be translated or moved along the fixture in a direction. In some embodiments, the enclosure can be made of a material that is transparent to electromagnetic waves receptive to the sensors encased by the enclosure. For example, the enclosure can be made from a transparent material that allows laser lights, radio waves, and visible lights emitted and/or received by the LiDARs, the radars, and the cameras, respectively, to enter and/or exit the enclosure. In some embodiments, the enclosure can include a signal transmitter and a signal receiver to aid enclosure alignment. The signal transmitter can emit a signal. This signal can be received or detected by the signal receiver. In some cases, the signal can be reflected, on a reflective surface, before being received or detected by the signal receiver. In one embodiment, both the signal transmitter and the signal receiver are integrated into the enclosure. In another embodiment, the signal transmitter is integrated into the enclosure while the signal receiver is integrated into the fixture. A signal intensity corresponding to the signal received by the signal receiver can be determined. Based on the signal intensity, a determination to whether the enclosure is aligned to its final alignment location with respect to the fixture can be made. For example, when the signal intensity is at its maximum, the enclosure is at or near the final alignment location. When the signal intensity is at zero, the enclosure is not at or near the final alignment location. In some embodiments, the signal transmitter and the signal receiver can be used to identify potential premature enclosure alignment deviations before the deviations manifest. For example, by aggregating, processing, and trending data corresponding to the signal intensity over a period of time, a nominal range for the signal intensity can be determined. Based on this nominal range, various insights regarding enclosure alignment can be identified. For instance, if the data corresponding to the signal intensity exhibits a trend that indicates or suggests that the signal intensity is about to fall outside of the nominal range, the trend could be an indication that the enclosure is about to move out of alignment with respect to the fixture. In some embodiments, a machine learning model can be used to identify potential premature enclosure alignment deviations. Various embodiments are discussed herein in greater detail.

FIG. 1A illustrates an example autonomous vehicle 100, according to an embodiment of the present disclosure. An autonomous vehicle 100 generally refers to a category of vehicles that are capable of sensing and driving in a surrounding by itself. The autonomous vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The autonomous vehicle 100 can also include myriad actuators to propel and navigate the autonomous vehicle 100 in the surrounding. Such actuators may include, for example, any suitable electro-mechanical devices or systems to control a throttle response, a braking action, a steering action, etc. In some embodiments, the autonomous vehicle 100 can recognize, interpret, and analyze road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust speed at which the autonomous vehicle 100 is traveling in relation to other objects in the surrounding. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on the conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include a LiDAR 102, radars 104, cameras 106, GPS, sonar, ultrasonic, IMU (inertial measurement unit), accelerometers, gyroscopes, magnetometers, FIR (far infrared) sensors, and/or the like. The one or more sensors allow the autonomous vehicle 100 to sense a surrounding around the autonomous vehicle 100. For example, the LiDARs 102 can be configured to generate a three-dimensional map of the surrounding. The LiDARs 102 can also be configured to detect objects in the surrounding. For another example, the radars 104 can be configured to determine distances and speeds of objects around the autonomous vehicle 100. For yet another example, the cameras 106 can be configured to capture and process image data to detect and identify objects, such as road signs, as well as analyzing content of the objects, such as speed limit posted on the road signs.

In the example of FIG. 1A, the autonomous vehicle 100 is shown with the LiDAR 102 mounted to a roof or a top of the autonomous vehicle 100. The LiDAR 102 can be configured to generate three dimensional maps and detect objects in the surrounding. In the example of FIG. 1A, the autonomous vehicle 100 is shown with four radars 104. Two radars are directed to a front-side and a back-side of the autonomous vehicle 100, and two radars are directed to a right-side and a left-side of the autonomous vehicle 100. In some embodiments, the front-side and the back-side radars can be configured for adaptive cruise control and/or accident avoidance. For example, the front-side radar can be used by the autonomous vehicle 100 to maintain a safe distance from a vehicle ahead of the autonomous vehicle 100. For another example, if the vehicle ahead experiences a sudden reduction in speed, the autonomous vehicle 100 can detect this sudden change in motion, using the front-side radar, and adjust its vehicle speed accordingly. In some embodiments, the right-side and the left-side radars can be configured for blind-spot detection. In the example of FIG. 1A, the autonomous vehicle 100 is shown with six cameras 106. Two cameras are directed to the front-side of the autonomous vehicle 100, two cameras are directed to the back-side of the autonomous vehicle 100, and two cameras are directed to the right-side and the left-side of the autonomous vehicle 100. In some embodiments, the front-side and the back-side cameras can be configured to detect, identify, and determine objects, such as cars, pedestrian, road signs, in the front and the back of the autonomous vehicle 100. For example, the front-side cameras can be utilized by the autonomous vehicle 100 to identify and determine speed limits. In some embodiments, the right-side and the left-side cameras can be configured to detect objects, such as lane markers. For example, side cameras can be used by the autonomous vehicle 100 to ensure that the autonomous vehicle 100 drives within its lane.

Figure 1B:
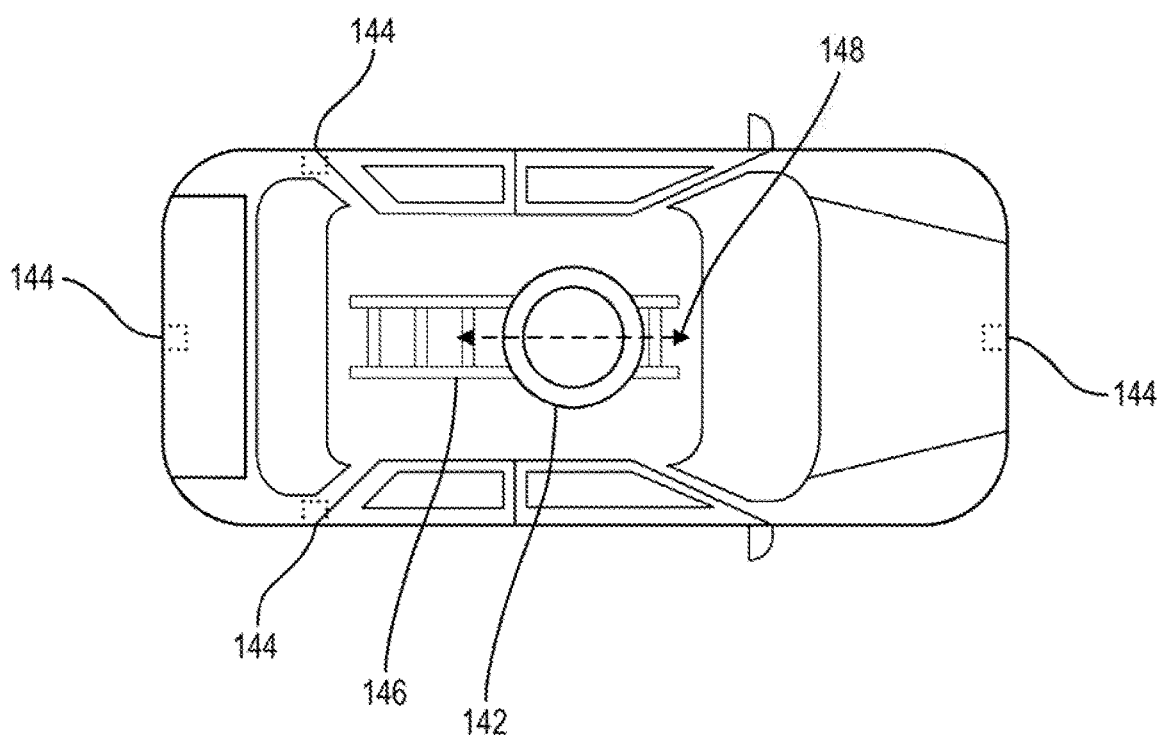
FIG. 1B illustrates an example autonomous vehicle, according to an embodiment of the present disclosure.

FIG. 1B illustrates an example autonomous vehicle 140, according to an embodiment of the present disclosure. In the example of FIG. 1B, the autonomous vehicle 140 is shown with an enclosure 142 and four radars 144. The enclosure 142 is mounted onto a fixture 146. In some embodiments, the fixture 146 can be a roof rack or a custom rack fitted to the autonomous vehicle 140. The enclosure 142, when mounted onto the fixture 146, can translate along a linear axis 148. For example, once mounted onto the fixture 146, the enclosure 142 can be adjusted to move in a forward or a backward direction with respect to the autonomous vehicle 140, along the linear axis 148 of the fixture 146. In some embodiments, the enclosure 142 can be moved along a nonlinear axis. In some embodiments, the enclosure 142 can include a LiDAR, a plurality of radars and cameras, and its associated electronics. In another embodiment, the enclosure 142 can include a LiDAR, a plurality of cameras, and its associated electronics. Many variations are possible. As discussed, the enclosure 142 allows sensors to be packaged compactly or tightly and to be moved from one vehicle to another in a single act, rather than a series of acts which requires moving the sensors one at a time and align each sensor individually thereafter. In various embodiments, the enclosure 142 can made from any materials that are transparent to electromagnetic waves emitted by or receptive to sensors encased in the enclosure 142. For example, the enclosure 142 must be transparent to laser beams emitted and received by the LiDAR inside the enclosure 142. In various embodiments, an outer cover of the enclosure 142 can be made from tempered glass, plexiglass, chemically strengthened glass, and the likes.

In some embodiments, the enclosure 142 can include a signal transmitter. The signal transmitter can emit a signal which can be received by a signal receiver. A signal intensity corresponding to the signal can be determined. As the enclosure 142 translates or moves along the fixture 146, the signal intensity changes. Based on the signal intensity, a determination of an extent of an alignment of the enclosure 142 with respect to the fixture 146 can be made. For example, during an enclosure alignment process, if the enclosure 142 is not at or near its final alignment location along the fixture 146, the signal intensity is zero. As the enclosure 142 continues to translate along the fixture 146 and moves closer and closer to the final alignment location, at some point, the signal intensity starts to increase. When the signal intensity is at or near its maximum value, the enclosure 142 is deemed to be at or near the final alignment location on the fixture 146 and the enclosure alignment process is complete. In some embodiments, the enclosure 142 can further include an audio device. The audio device can emit an audio cue based on the signal intensity. For example, the audio device emits an audio cue that changes its amplitude (e.g., loudness) and/or frequency (e.g., pitch) corresponding to the signal intensity to indicate that the enclosure 142 is nearing the final alignment location. In some embodiments, the signal transmitter and the signal receiver can be used to indicate premature enclosure alignment deviations. For example, once aligned, if the signal receiver no longer receives a signal from the signal transmitter, this could be an indication that the enclosure 142 is out of alignment and immediate attention is needed. In some embodiments, data corresponding to signal intensity can be aggregated, processed, and trended over a period of time to identify or predict premature enclosure alignment deviations before the deviations manifest. The data corresponding to the signal intensity can be aggregated over a set period (e.g., a hour, a day, etc.). This data can be processed to determine a maximum signal intensity, a minimum signal intensity, and an average signal intensity for the set period. The maximum signal intensity, the minimum signal intensity, and the average signal intensity in the set period can be trended over a period of time (e.g., a week, two weeks, a month, a year, etc.). A nominal range for the signal intensity can be defined based on the trending of the maximum and the minimum signal intensity. In some embodiments, the nominal range for the signal intensity can be defined by a highest value in the maximum signal intensity over the period of time and a lowest value in the minimum signal intensity over the same period of time. Based on this nominal range, various insights can be derived to identify or predict premature enclosure alignment deviations. For instance, if trending of the signal intensity indicates or suggests that the signal intensity is about to fall outside of the nominal range, the trending could indicate that the enclosure is about to be out of alignment. In some embodiments, a machine learning model can be trained with a set of training data to identify or predict premature enclosure alignment deviations. Premature enclosure alignment deviations will be discussed in greater detail with respect to FIG. 2 herein.

Figure 2:
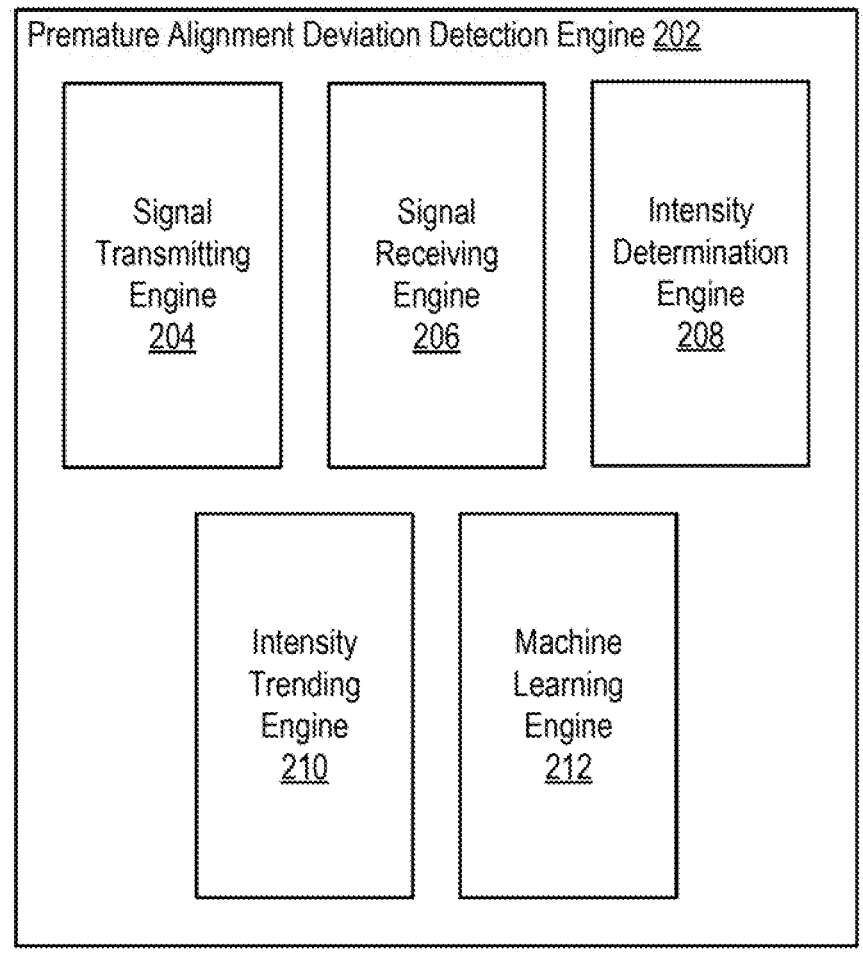
FIG. 2 illustrates a block diagram of an example enclosure alignment anomaly detection system, according to an embodiment of the present disclosure.

FIG. 2 illustrates a block diagram of an example enclosure alignment anomaly detection system 200, according to an embodiment of the present disclosure. The example enclosure alignment anomaly detection system 200 can include a premature alignment deviation detection engine 202 that further includes one or more processors and memory. The processors, in conjunction with the memory, can be configured to perform various operations associated with the example enclosure alignment anomaly detection system 200. For example, the processors and memory can be used to determine, based on a signal received by a signal receiver (e.g., the signal receiver of FIG. 1B), that an enclosure (e.g., the enclosure 142 of FIG. 1B) is about to be out of alignment. In various embodiments, the premature alignment deviation detection engine 202 can be configured to identify or predict a premature enclosure alignment deviation associated with the enclosure aligned to a fixture (e.g., the fixture 146 of FIG. 1B) before the deviation manifest. As shown in FIG. 2, in some embodiments, the premature alignment deviation detection engine 202 can further include a signal transmitting engine 204, a signal receiving engine 206, an intensity determination engine 208, an intensity trending engine 210 and a machine learning engine 212. The signal transmitting engine 204, the signal receiving engine 206, the intensity determination engine 208, the intensity trending engine 210, and the machine learning engine 212 will be discussed in further detail below.

In some embodiments, the enclosure alignment deviation detection system 200 can additionally include at least one data store 220 that is accessible to the premature alignment deviation detection engine 202. In some embodiments, the data store 220 can be configured to store parameters, data, configuration files, or machine-readable codes of the signal transmitting engine 204, the signal receiving engine 206, the intensity determination engine 208, the intensity trending engine 210, and the machine learning engine 212.

The signal transmitting engine 204 can be configured to emit a signal to be received or detected by the signal receiving engine 206. In various embodiments, the signal transmitting engine 204 can be implemented with a light source. The light source can be an electro-optical device that converts electricity or electric signal into light or optical signal. In one embodiment, the light source can be a photodiode such as a light emitting diode (LED). In another embodiment, the light source can be a laser diode. In various embodiments, the signal emitted by the signal transmitting engine 204 depends on the light source used. For example, if LED is used as the light source, the signal emitted, correspondingly, will be visible light. For another example, if laser diode is used as the light source, the signal emitted, correspondingly, will be coherent light. In various embodiments, the signal transmitting engine 204 can be integrated into the enclosure.

In some embodiments, the signal transmitting engine 204 can include a reflective surface. The reflective surface can redirect a path of the light emitted by the light source. For example, in an embodiment, the light emitted from the light source can be redirected by or reflected from the reflective surface so that the light can be detected by the signal receiving engine 206. The light produced by the light source can offset at an angle as measured from the reflective surface. This light (i.e., incident light) hits the reflective surface and is redirected by the reflective surface by that same angle. The signal transmitting engine 204 will be discussed in greater detail with respect to FIG. 3A herein.

The signal receiving engine 206 can be figured to receive or detect the signal emitted by the signal transmitting engine 204. In various embodiments, the signal receiving engine 206 can be implemented with a light detector. The light detector can be an electro-optical device that converts light or optical signal into electricity or electric signal. This electric signal can then be further processed and analyzed by the intensity determination engine 208 to compute, measure, or determine a signal intensity corresponding to the signal (e.g., light) received by the signal receiving engine 206. In general, the signal emitted by the signal transmitting engine 204 is matched or tuned to the signal receiving engine 206. For example, if a LED light source is used, the light detector is matched or tuned be most receptive to the light emitted by the LED light source. For another example, if a laser diode is used, the light detector is matched or tuned to be most receptive to the light (e.g., laser or coherent light) emitted by the laser diode. In these examples, tuning of the light detector prevents stray lights (or ambient lights) from skewing intensity computation. In some embodiments, the signal receiving engine 206 can be integrated into the enclosure. In some embodiments, the signal receiving engine 206 can in integrated into the fixture.

The intensity determination engine 208 can be configured to compute, measure, or determine a signal intensity corresponding to the signal received or detected by the signal receiving engine 206. In various embodiments, the signal received or detected by the signal receiving engine 206 depends on position of the enclosure with respect to the fixture. For example, in the embodiment where the signal transmitting engine 204 and the signal receiving engine 206 are incorporated into the enclosure, if the enclosure is not near its final alignment location, the signal emitted by the signal transmitting engine 204 will not be not received or detected by the signal receiving engine 206. In this example, the intensity determination engine 208 computes, measures, or determines the signal intensity to be zero, which, in this case, indicates that the enclosure is not in the final alignment location. As the enclosure translates or moves closer to the final alignment location along the fixture, at some point, the signal will be partially received or detected by the signal receiving engine 206, through a reflective surface, and the intensity determination engine 208 computes, measures, or determine the signal intensity to be some fraction or portion of a maximum signal intensity. This signal intensity indicates that the enclosure is closer to the final alignment location. If the signal is fully received or detected by the signal receiving engine 206, the intensity determination engine 208 computes, measures, or determines the signal intensity to be at the maximum signal intensity. In this case, the maximum signal intensity indicates that the enclosure is at the final alignment location. In some embodiments, the maximum signal intensity can be determined based on historical signal intensity. For example, there can be a fleet of autonomous vehicles with each autonomous vehicle being exactly the same as other autonomous vehicles and having exactly the same sensor enclosure and fixture. In this example, because the enclosure's location does not change in relation to the fixture from one autonomous vehicle to another autonomous vehicle, the location corresponding to the maximum signal intensity does not change. Therefore, based on the historical signal intensity, the final alignment location can be determined for the whole fleet of autonomous vehicles. In some embodiments, the historical signal intensity can be used to detect alignment errors. For example, a relative enclosure location with respect to a fixture as indicated by the measured signal intensity can be compared with a known enclosure location to identify errors in an enclosure alignment location. In some embodiments, if light sensor and light detectors are used to implement functionalities of the signal transmitting engine 204 and signal receiving engine 206, a signal intensity is equivalent to a luminance of a light.

The intensity trending engine 210 can be configured to identify or predict premature enclosure alignment deviations before the deviations manifest. The intensity trending engine 210 can identify or predict premature enclosure alignment deviations by aggregating, processing, and trending data corresponding to signal intensity obtained from the intensity determination engine 210. The intensity trending engine 210 can trend data corresponding to the signal intensity obtained from the intensity determination engine 208. In general, once the enclosure is aligned to the fixture, signal intensity can change in response to various vibrations or stress (e.g., wind-resistances, inertial forces, etc.) experienced by the enclosure. For example, as the autonomous vehicle drives through a road imperfection (e.g., a speed bump, a pothole, etc.), the impact from the road imperfection can cause the signal emitted by the signal transmitting engine 204 to momentarily move around (e.g., jump around, shake, etc.) in response to the impact. This physical movement of the signal can be received or detected by the signal receiving engine 206 to be some fraction less than the maximum signal intensity. The intensity trending engine 210, therefore, in some embodiments, can interface with the intensity determination engine 208 to characterize the various vibrations experienced by the enclosure in a given day and define a nominal range for signal intensity that is considered to be normal. In various embodiments, the intensity trending engine 210 can obtain signal intensity from the intensity determination engine 208. The intensity trending engine 210 can aggregate, process, and trend data corresponding to the signal intensity over a period of time. Data corresponding to the signal intensity can be aggregated over a set period (e.g., a hour, a day, etc.). This data can be processed to determine a maximum signal intensity, a minimum signal intensity, and an average signal intensity for the set period. The maximum signal intensity, the minimum signal intensity, and the average signal intensity in the set period can be trended over a period of time (e.g., a week, two weeks, a month, a year, etc.). A nominal range for the signal intensity can be defined based on the trend of the maximum and the minimum signal intensity. The nominal range for the signal intensity can be determined over the period of time using various regression or statistical methods. For example, a regression analysis (or technique) can be used to determine an upper and a lower bound for the nominal range. In some embodiments, the upper bound of the nominal range can be defined by a highest value in the maximum signal intensity over the period of time and the lower bound of the nominal range can be defined by a lowest value in the minimum signal intensity over the same period of time. Once the nominal range for the signal intensity is determined, the intensity trending engine 210 can identify or predict premature enclosure alignment deviations. In some embodiments, the intensity trending engine 210 can characterize and monitor a trend of the signal intensity based on the maximum signal intensity over the period of time and the average signal intensity over the period of time. Any trends of the maximum signal intensity or the average signal intensity that deviate from nominal behavior can indicate a premature enclosure alignment deviation. The intensity trending engine 210 will be discussed in further detail with respect to FIGS. 4A and 4B herein.

The machine learning engine 212 can be configured to identify or predict premature enclosure alignment deviations before the deviations manifest. The machine learning engine 212 can obtain data corresponding to signal intensity from the intensity determination engine 208. The machine learning engine 212 can be trained, using a training data set, to identify a premature enclosure alignment deviation based on signal intensity. In some embodiments, the machine learning engine 212 may be classifiers. The machine learning engine 212 can be trained with any suitable machine learning technique. In some embodiments, a suitable machine learning technique can include artificial neural networks, such as deep neural networks. In some embodiments, the machine learning techniques can be supervised or at least partially supervised. In other instances, the machine learning techniques can be at least partially unsupervised. The machine learning engine 212 may be configured to output a confidence score corresponding to a premature enclosure alignment deviation. The confidence score can indicate a probability of the identified or predicted premature enclosure alignment deviation accurately reflecting the enclosure's current alignment with respect to the fixture. The machine learning engine 212 will be discussed in further detail with respect to FIG. 4C herein.

Figure 3A:
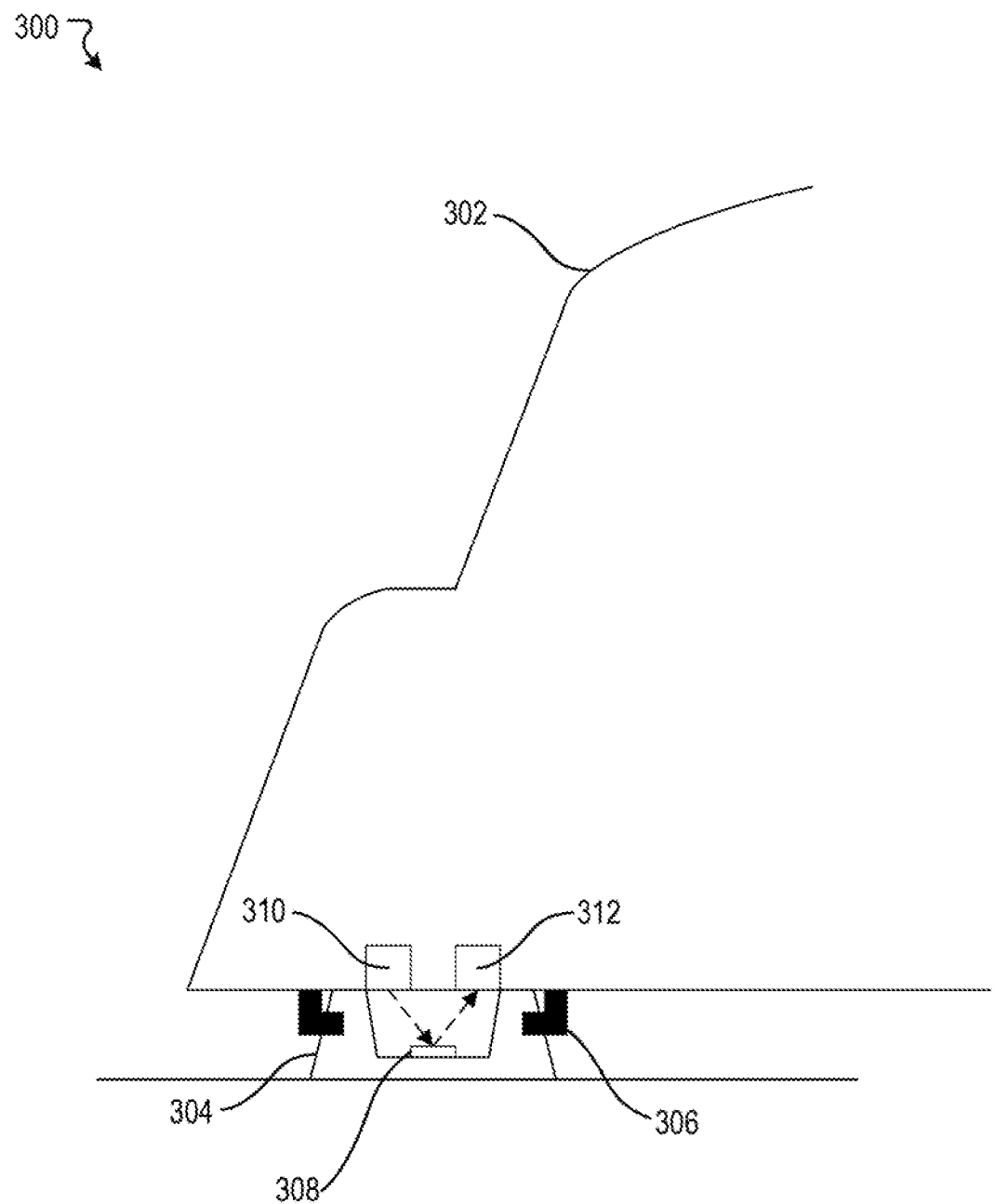
FIG. 3A illustrates a cross-sectional view of an example enclosure alignment deviation detection system, according to an embodiment of the present disclosure.

FIG. 3A illustrates a cross-sectional view of an example enclosure alignment deviation detection system 300, according to an embodiment of the present disclosure. In this example, the enclosure alignment deviation detection system 300 includes an enclosure 302 mounted onto a fixture 304 secured by one or more securing clamps 306. The one or more securing clamps 306 hold the enclosure 302 securely onto the fixture 304. In some embodiments, the enclosure 302 can include a plurality of sensors (e.g., a LiDAR and a plurality of cameras) that are associated with an autonomous vehicle. In some embodiments, the enclosure 302 can be made from materials that are transparent to lights receptive to the plurality of sensors. Once mounted, the enclosure 302 can translate along rails of the fixture 304. In some embodiments, the enclosure 302 can include a light source 310 and a light detector 312. The light source 310 can emit a light that can be received by the light detector 312. In this example, because the light source 310 and the light detector 312 are both integrated into the enclosure 302, the light will not be received by the light detector 314 unless the light is reflected. As such, the enclosure alignment deviation detection system 300 can further include a reflective surface 308 at a particular location within the rails of the fixture 304. This particular location indicates a final alignment location for which the enclosure 302 is positioned with respect to the fixture 304. This alignment location ensures that calibration associated with the plurality of sensors encased by the enclosure 302 remains intact and thus, data collected by the plurality of sensors can be subsequently processed and analyzed without further calibration. Therefore, as the enclosure 302 is translated along the fixture 304, at some point, the light emitted by the light source 310 will be reflected off from the reflective surface 308 and received by the light detector 312. When this occurs, it is an indication that the enclosure 302 is positioned correctly on the fixture 304, therefore the enclosure 302 is aligned.

Figure 3B:
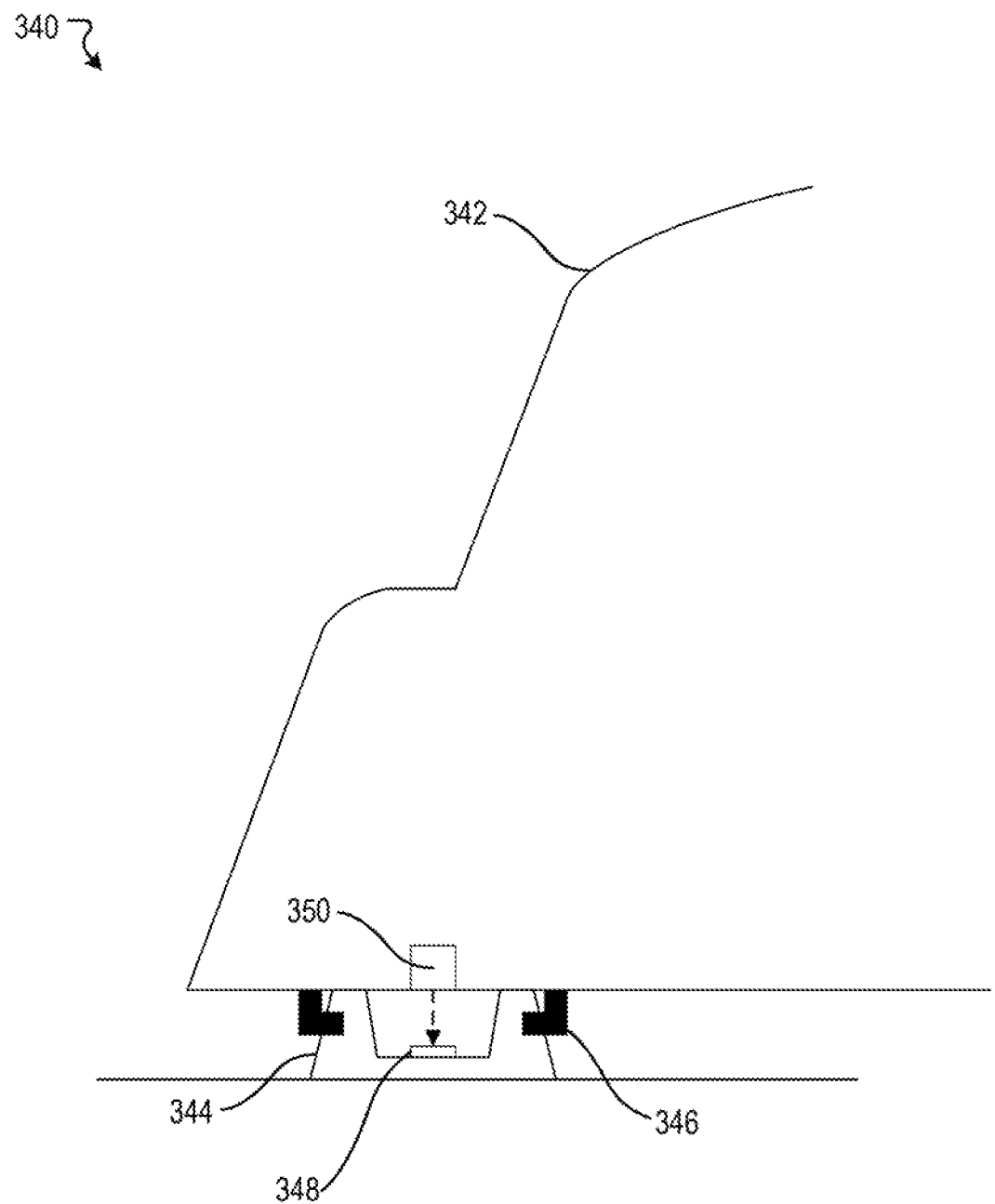
FIG. 3B illustrates a cross-sectional view of an example enclosure alignment deviation detection system, according to an embodiment of the present disclosure.

FIG. 3B illustrates a cross-sectional view of an example enclosure alignment deviation detection system 340, according to an embodiment of the present disclosure. In this example, the enclosure alignment deviation detection system 340 includes an enclosure 342 mounted onto a fixture 344 secured by one or more securing clamps 346. The one or more securing clamps 346 hold the enclosure 342 securely onto the fixture 344. In some embodiments, the enclosure 342 can include a plurality of sensors (e.g., a LiDAR and a plurality of cameras) that are associated with an autonomous vehicle. In some embodiments, the enclosure 342 can be made from materials that are transparent to lights receptive to the plurality of sensors. Once mounted, the enclosure 342 can translate along rails of the fixture 344. In some embodiments, the enclosure alignment deviation detection system 340 can further include a light detector 348 at a particular location within the rails of the fixture 344. This particular location indicates a final alignment location to which the enclosure 342 is positioned with respect to the fixture 344. This alignment location ensures that calibration associated with the plurality of sensors encased by the enclosure 342 remains intact and thus, data collected by the plurality of sensors can be subsequently processed and analyzed without further calibration. In this example, the enclosure 342 can further include a light source 350. The light source 350 can emit a light that can be received directly by the light detector 348. As the enclosure 342 is translated along the fixture 344, at some point, the light emitted by the light source 350 will be received directly by the light detector 348. When this occurs, it is an indication that the enclosure 342 is positioned correctly on the fixture 344, therefore the enclosure 342 is aligned. For example, the light detector 348 may determine whether a luminance of the light emitted by the light source 350 is equal to a known luminance of the light source. The light detector 348 may also determine a rate of change (e.g., derivative) of the luminance of the detected light from the light source 350 over time to determine the maximum luminance. In another example, the light detector 348 may also determine a rate of change (e.g., derivative) of the luminance of the detected light from the light source 350 over time to determine when the enclosure 342 is perfectly aligned with respect to the fixture 344. For example, the light detector 348 may determine that the enclosure 342 is perfectly aligned with respect to the fixture 344 when the rate of change (e.g. derivative) of the luminance of the detected light with respect to time, is zero. As another example, the light detector 348 may determine that the enclosure 342 is moving away from a fully aligned position with respect to the fixture 344 if the determined rate of change of the luminance of the detected light with respect to time, is negative. In such case, the enclosure 342 may be translated in an opposite direction to move toward the fully aligned position. As another example, the light detector 348 may determine that the enclosure 342 is moving toward the fully aligned position with respect to the fixture 344 if the determined rate of change of the luminance of the detected light with respect to time, is positive.

Figure 4A:
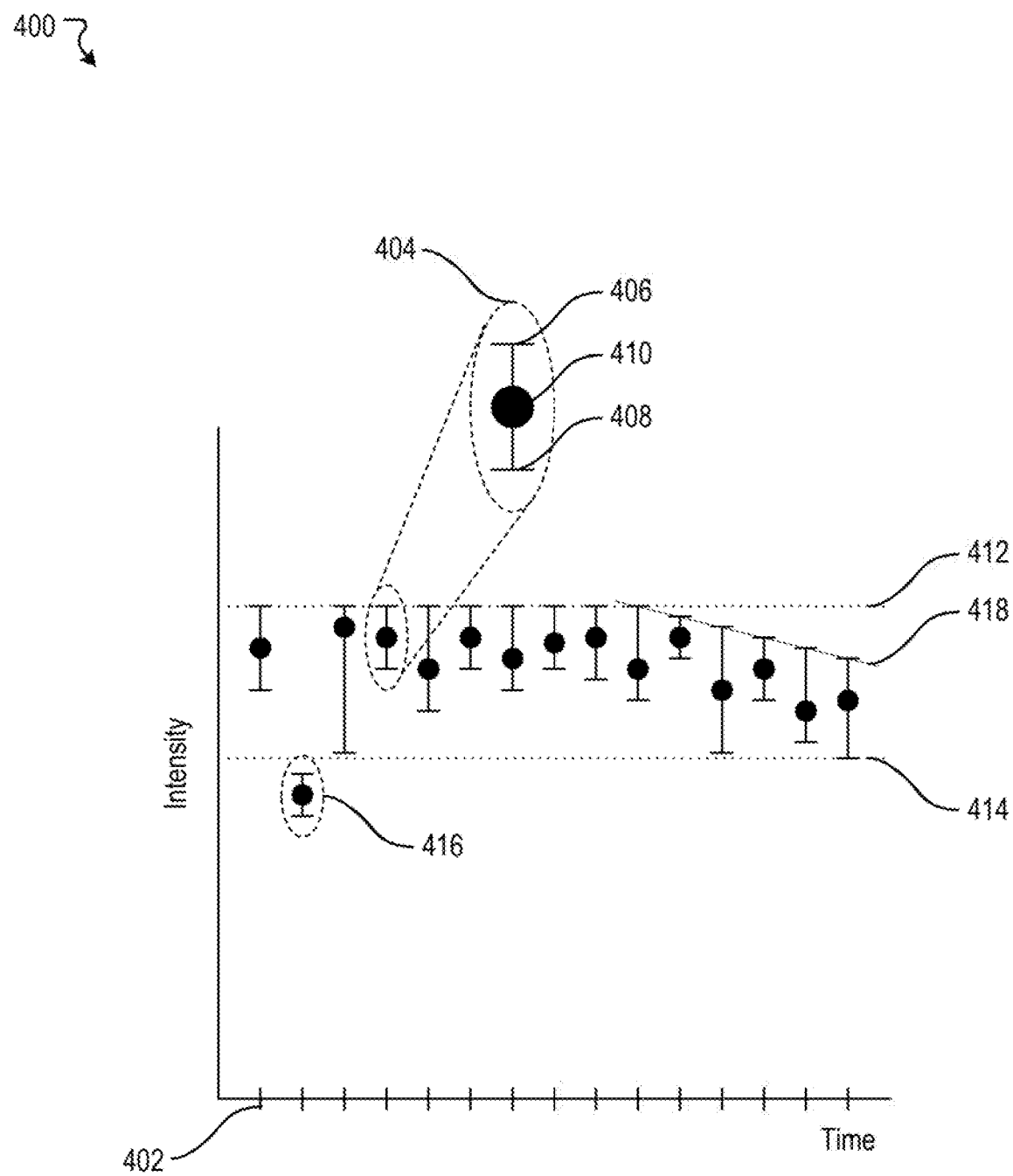
FIG. 4A illustrates a signal intensity trending scenario, according to an embodiment of the present disclosure.

FIG. 4A illustrates a signal intensity trending scenario 400, according to an embodiment of the present disclosure. An x-y plot is presented in this example scenario 400. The x-y plot can represent a plot of signal intensity aggregated over a period of time. An x-axis of the x-y plot can represent a time scale with each increment 402 of the x-axis representing a set period (e.g., a hour, a day, etc.) in the time scale. A y-axis of the x-y plot can represent an intensity data (e.g., 404) collected over the set period as measured by a signal receiver (e.g., the signal receiver 312 of FIG. 3A or the signal receiver 348 of FIG. 3B) of an enclosure (e.g., the enclosure 300 of FIG. 3A or the enclosure 340 of FIG. 3B) aligned to an autonomous vehicle. In the example of FIG. 4A, the intensity data is plotted over a period of time (e.g., a week, two weeks, a month, etc.). In various embodiments, the intensity data can be plotted over a week, two weeks, a month, a year, etc. Many variations are possible. Within each intensity data (e.g., 404), there can be a maximum signal intensity (e.g., 406), a minimum signal intensity (e.g., 408), and an average signal intensity (e.g., 410) measured for that set period. The maximum signal intensity (e.g., 406) indicates the enclosure's final alignment location and, thus, is normal and same for each set period. The minimum signal intensity (e.g., 408) indicates a degree of deviation that results from vibrations experienced by the enclosure. In general, the smaller or lower the minimum signal intensity, the larger the vibrations the enclosure experiences. The average signal intensity (e.g., 410) is simply an average of signal intensity measured in that set period. In general, the intensity data can vary greatly between set periods. For example, bumps and vibrations experienced by the enclosure can be greater one day than the next day or from one hour to the next hour. For instance, roads driven by the autonomous vehicle may have more road imperfections (e.g., potholes, speed bumps, uneven roads, etc.) one day than the next day. As the autonomous vehicle drives through the road imperfections, the resulting vibrations translate to the enclosure and cause the enclosure to momentarily vibrate. This vibration causes signal received by the signal receiver to momentarily move around (e.g., jump around, shake, etc.), which causes the intensity data to have a spread. Therefore, in this example, the spread of the intensity data can be larger (wider) on some set periods than other set periods. However, the maximum signal intensity (e.g., 406) of the intensity data (e.g., 404) should be same from set period to set period because the maximum signal intensity represents the final alignment location for which the enclosure is already aligned to and is not expected to change. In the example of FIG. 4A, the x-y plot can have a upper bound 412 and a lower bound 414. The upper bound 412 and the lower bound 414 indicate a nominal range (i.e., normal or expected range) for the intensity data over the period of time. The upper bound 412 can be determined by identifying a highest value in the maximum signal intensity over the period of time. The lower bound 414 can be determined by identifying a lowest value in the minimum signal intensity over the period of time. Any intensity data (e.g., 416) that falls outside of the nominal range is a suspicious data point and likely indicates that the enclosure's alignment is off (e.g., the enclosure is no longer at the final alignment location) or that the alignment has shifted. As such, immediate attention is needed. In the example of FIG. 4A, the x-y plot further depicts a trend 418 based on the maximum signal intensity measured for each set period. The trend 418 can be determined using various regression or other statistical methods. For example, a linear regression can be used to generate the trend 418 based on the maximum signal intensity of each set period. In this example, although the trend 418 is still within the nominal range defined by the upper bound 412 and the lower bound 414, the downward slope of the trend 418 may indicate a premature enclosure alignment deviation is about to manifest and immediate attention is needed. In some embodiments, the autonomous can transmit an alert to an operator of the autonomous vehicle indicating the premature enclosure alignment deviation.

Figure 4B:
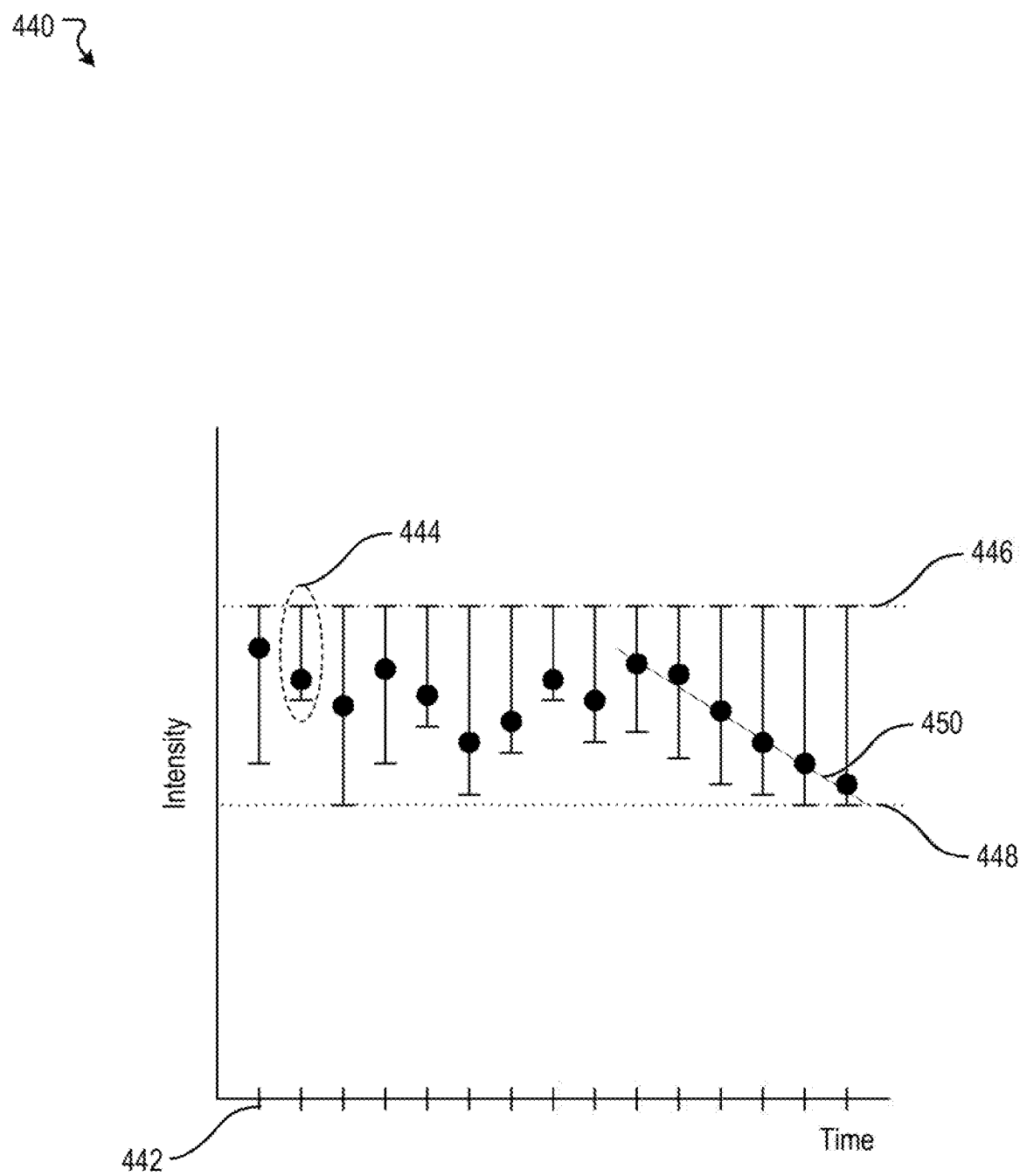
FIG. 4B illustrates a signal intensity trending scenario, according to an embodiment of the present disclosure.

FIG. 4B illustrates a signal intensity trending scenario 440, according to an embodiment of the present disclosure. An x-y plot is presented in this example scenario 440. The x-y plot in this example scenario 440 is similar to the x-y plot depicted in FIG. 4A. An x-axis of the x-y plot in the example scenario 440 can represent a time scale with each increment 442 of the x-axis representing a set period (e.g., a hour, a day, etc.) in the time scale. A y-axis of the x-y plot in the example scenario 440 can represent an intensity data (e.g., 444) of the set period as measured by a signal receiver (e.g., the signal receiver 312 of FIG. 3A or the signal receiver 348 of FIG. 3B) of an enclosure (e.g., the enclosure 300 of FIG. 3A or the enclosure 340 of FIG. 3B) aligned to an autonomous vehicle. In the example of FIG. 4B, the intensity data is plotted over a period of time (e.g., a week, two weeks, a month, etc.). Similarly, the intensity data can have a maximum signal intensity, a minimum signal intensity, and an average signal intensity corresponding to the intensity data (e.g., 444) measured for that set period. Furthermore, an upper bound 446 and a lower bound 448 defines a nominal range for the intensity data over the period of time. In the example of FIG. 4B, the x-y plot depicts a trend 450 based on the average signal intensity measured for each set period. The trend 450 can be determined using various regression or other statistical methods. For example, a linear regression can be used to generate the trend 450 based on the average signal intensity of each set period. In this example, although the trend 450 is still within the nominal range defined by the upper bound 446 and the lower bound 448, the downward slope of the trend 450 may indicate that the enclosure might not be secured tightly to the fixture and immediate attention is needed. Because the average signal intensity represent an average of signal intensity and the signal intensity can represent a degree of vibration experienced by an enclosure, the trend 450 may suggest that the enclosure is experiencing more vibrations than usual. This phenomenon could be caused by, for example, a securing clap (e.g., the securing clamp 306 of FIG. 3A or the securing clamp 346 of FIG. 3B) of the enclosure is getting loose over some period of time.

Figure 4C:
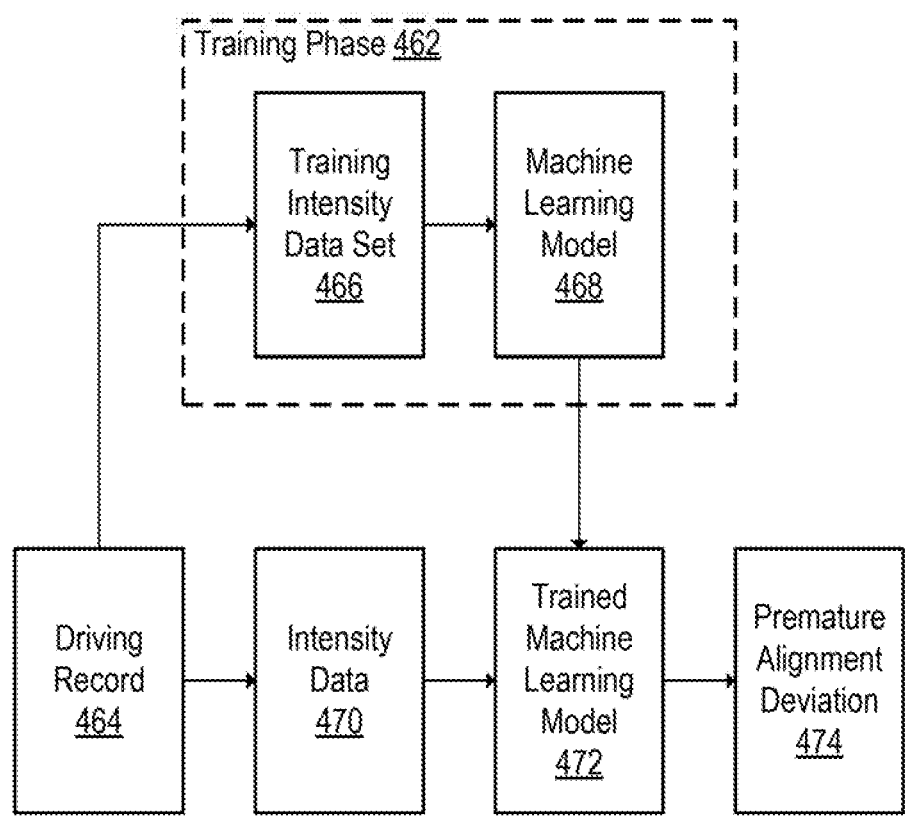
FIG. 4C illustrates a machine learning scenario, according to an embodiment of the present disclosure.

FIG. 4C illustrates a machine learning scenario 460, according to an embodiment of the present disclosure. In various embodiments, a machine learning model 468 can be used to identify premature enclosure alignment deviations 474 from driving record 464. The machine learning model 468 may be trained in a training phase 462 before the machine learning model 468 can be used to identify premature enclosure alignment deviations 474. In the training phase 462, a training intensity data set 466 can be used to train the machine learning model 468. The training intensity data set 466 comprises human annotated data sets in the driving record 464 indicating whether data in the training intensity data set 466 is nominal or not nominal. Based on the human annotated data set in the training intensity data set 446, the machine learning model 468 can be trained to identify premature enclosure alignment deviations 474 from the driving records 464 before the deviations manifest. In some embodiments, the machine learning model 468 may be implemented using a classifier, a neural network, or a convolutional neural network. Many variations are possible and contemplated. Once trained, the machine learning model 468 becomes a trained machine learning model 472. The trained machine learning model 472 obtains intensity data 470 from the driving record 464. In some embodiments, the intensity data 470 comprises data corresponding to signal intensity over a set period. The set period can be an hour, a day, a week, etc. The trained machine learning model 472 processes the intensity data 470 and output a confidence score indicating a likelihood of an existence of a premature enclosure alignment deviation (e.g., 474) based on the intensity data 470. The confidence score indicates a confidence of the trained machine learning model 472 in assessing the existence of the premature enclosure alignment deviation. For example, based on the intensity data 470, the trained machine learning model 472 indicates the existence of the premature enclosure alignment deviation with a confidence score of seven out of ten. In this example, the confidence of seven indicates there is a seventy percent likelihood that the premature enclosure alignment deviation exists in intensity data 470. In some embodiments, the trained machine learning model 472 may also indicate a range of an amount of the premature enclosure alignment deviation, and a confidence interval of the amount of the premature enclosure alignment deviation.

FIG. 5 illustrates an example method 500, according to an embodiment of the present disclosure. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, an enclosure is translated along a fixture to a final alignment location on the fixture. At block 504, a signal transmitted by a signal transmitter is received by a signal receiver. The signal transmitter is integrated into the sensor enclosure. At block 506, the signal receiver determines a signal intensity based on the received signal. The signal intensity is determined based in part on the final alignment location of the sensor enclosure on the fixture. At block 508, an enclosure alignment anomaly is identified based on the signal intensity.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
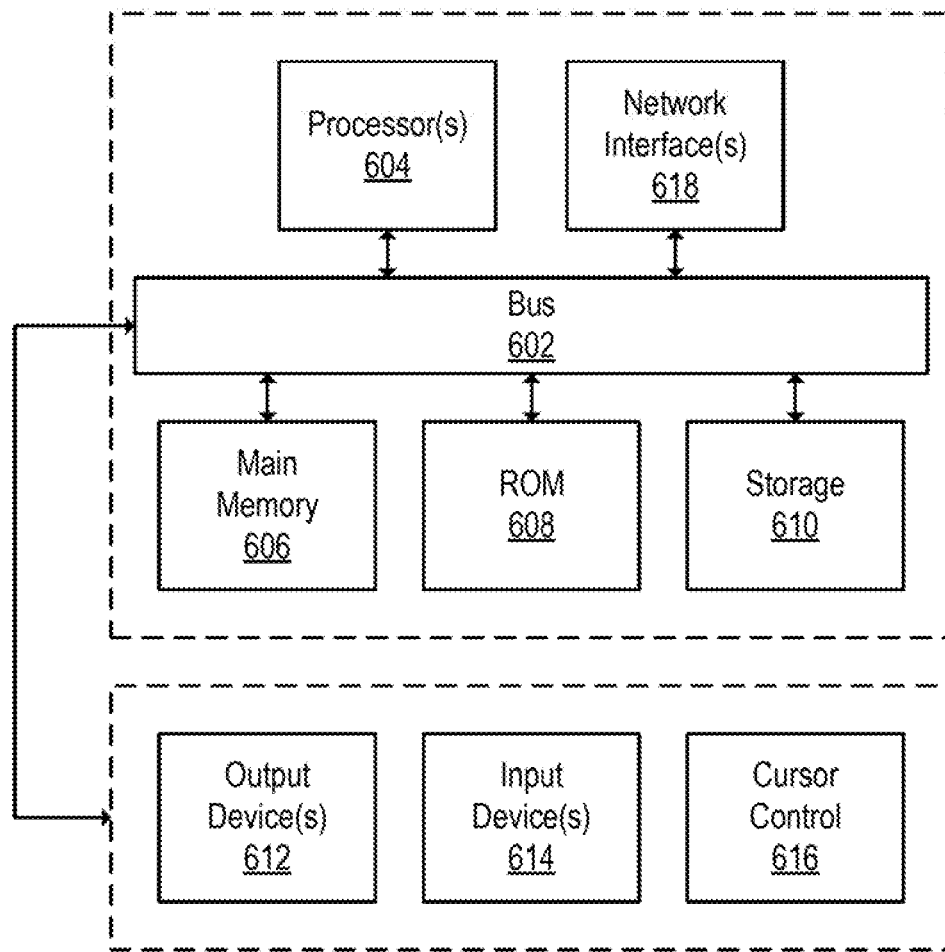
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for detecting enclosure alignment anomalies comprising:
   translating a sensor enclosure along a fixture to a final alignment location on the fixture;
   receiving, by a signal receiver, a signal transmitted by a signal transmitter, the signal transmitter integrated into the sensor enclosure;
   determining, by the signal receiver, a signal intensity based on the received signal and in part on the final alignment location of the sensor enclosure on the fixture; and
   identifying an enclosure alignment anomaly based on the signal intensity, wherein the identifying the enclosure alignment anomaly based on the signal intensity comprises:
      aggregating data corresponding to the signal intensity for a set period;
      processing the data corresponding to the signal intensity to determine a maximum signal intensity, a minimum signal intensity, and an average signal intensity for the set period; and
      determining, based on an upper bound and a lower bound of the data corresponding to the signal intensity, a nominal range for the signal intensity over a period of time.

2. The method of claim 1, wherein the signal reflects off from a reflective surface in the fixture and the signal receiver is integrated into the sensor enclosure.

3. The method of claim 1, wherein the signal is directly received by the signal receiver and the signal receiver is integrated into the fixture.

4. The method of claim 1, wherein the upper bound is defined as a highest value in the maximum signal intensity over the period of time and the lower bound is defined as a lowest value in the minimum signal intensity over the period of time.

5. The method of claim 1, wherein the upper bound and the lower bound are determined using regression.

6. The method of claim 1, wherein the identifying the enclosure alignment anomaly based on the signal intensity further comprises:
   identifying a data point outside of the nominal range in the data corresponding to the signal intensity; and
   identifying the data point as indicative of an enclosure alignment deviation.

7. The method of claim 1, wherein the identifying the enclosure alignment anomaly based on the signal intensity further comprises:
   trending the maximum signal intensity for the set period over the period of time;
   determining a trend based on the trending of the maximum signal intensity using at least a regression technique; and
   identifying the trend as indicative of a potential premature enclosure alignment deviation.

8. The method of claim 1, wherein the identifying the enclosure alignment anomaly based on the signal intensity further comprises:
   trending the average signal intensity for the set period over the period of time;
   determining a trend based on the trending of the average signal intensity using a regression technique; and
   identifying the trend as indicative of a potential premature enclosure alignment deviation.

9. The method of claim 1, wherein the identifying the enclosure alignment anomaly based on the signal intensity comprises:
   training a machine learning model using a training data set, wherein the machine learning model is implemented using at least one of a classifier or a neural network, and the training data set is based on data corresponding to the signal intensity with human annotations;
   receiving the data corresponding to the signal intensity; and
   determining, based on the data corresponding to the signal intensity, an existence of a potential premature enclosure alignment deviation in the data corresponding to the signal intensity.

10. A system for detecting enclosure alignment anomalies comprising:
    a sensor enclosure to be aligned onto a fixture, the sensor enclosure aligned to a final alignment location on the fixture;
    a signal transmitter to transmit a signal, the signal transmitter integrated into the sensor enclosure;
    a signal receiver to:
       receive the signal; and
       determine, based in part on the final alignment location of the sensor enclosure on the fixture, a signal intensity of the received signal; and
    a computing system to identify an enclosure alignment anomaly based on the signal intensity, wherein the identifying the enclosure alignment anomaly based on the signal intensity comprises:
       aggregating data corresponding to the signal intensity for a set period;
       processing the data corresponding to the signal intensity to determine a maximum signal intensity, a minimum signal intensity, and an average signal intensity for the set period; and
       determining, based on an upper bound and a lower bound of the data corresponding to the signal intensity, a nominal range for the signal intensity over a period of time.

11. The system of claim 10, wherein the signal reflects off from a reflective surface in the fixture and the signal receiver is integrated into the sensor enclosure.

12. The system of claim 10, wherein the signal is directly received by the signal receiver and the signal receiver is integrated into the fixture.

13. The system of claim 10, wherein the upper bound is defined as a highest value in the maximum signal intensity over the period of time and the lower bound is defined as a lowest value in the minimum signal intensity over the period of time.

14. The system of claim 10, wherein the upper bound and the lower bound are determined using regression.

15. The system of claim 10, wherein the identifying the enclosure alignment anomaly based on the signal intensity further comprises:
    identifying a data point outside of the nominal range in the data corresponding to the signal intensity; and
    identifying the data point as indicative of an enclosure alignment deviation.

16. The system of claim 10, wherein the identifying the enclosure alignment anomaly based on the signal intensity further comprises:

trending the maximum signal intensity for the set period over the period of time;

determining a trend based on the trending of the maximum signal intensity using a regression technique; and identifying the trend as indicative of a potential premature enclosure alignment deviation.

17. The system of claim 10, wherein the identifying the enclosure alignment anomaly based on the signal intensity further comprises:

trending the average signal intensity for the set period over the period of time;

determining a trend based on the trending of the average signal intensity using at least a regression technique; and identifying the trend as indicative of a potential premature enclosure alignment deviation.

18. The system of claim 10, wherein the identifying the enclosure alignment anomaly based on the signal intensity comprises:

training a machine learning model using a training data set, wherein the machine learning model is implemented using at least one of a classifier or a neural network, and the training data set is based on data corresponding to the signal intensity with human annotations;

receiving the data corresponding to the signal intensity; and determining, based on the data corresponding to the signal intensity, an indication of a potential premature enclosure alignment deviation in the data corresponding to the signal intensity.

19. A system comprising:

one or more processors; and a memory storing instructions that, when executed by the one or more processors, cause the system to perform:

translating a sensor enclosure along a fixture to a final alignment location on the fixture;

receiving, by a signal receiver, a signal transmitted by a signal transmitter, the signal transmitter integrated into the sensor enclosure;

determining, by the signal receiver, a signal intensity based on the received signal and in part on the final alignment location of the sensor enclosure on the fixture; and identifying an enclosure alignment anomaly based on the signal intensity, wherein the identifying the enclosure alignment anomaly based on the signal intensity comprises:

aggregating data corresponding to the signal intensity for a set period;

processing the data corresponding to the signal intensity to determine a maximum signal intensity, a minimum signal intensity, and an average signal intensity for the set period; and determining, based on an upper bound and a lower bound of the data corresponding to the signal intensity, a nominal range for the signal intensity over a period of time.

\* \* \* \* \*